3,532,533
METHOD OF PRIMING POLYVINYL CHLORIDE SURFACES
Joseph I. Ackerman, Jr., Arlington, Mass., assignor to USM Corporation, Flemington, N.J., a corporation of New Jersey
No Drawing. Filed Mar. 1, 1967, Ser. No. 619,613
Int. Cl. B44d *1/092;* B32b *27/08*
U.S. Cl. 117—47
8 Claims

ABSTRACT OF THE DISCLOSURE

The invention is directed to priming polyvinyl chloride surfaces to improve their adhesion with polyester-based thermoplastic adhesives. Primers used for this purpose include carboxylic acids.

---

The present invention relates to polyvinyl chloride surfaces and particularly to adhesion of the same by polyester-based thermoplastic adhesives.

Considered generally, polyester-based thermoplastic adhesives, sometimes referred to as hot melt adhesives or cements have received increasingly wide use. They are particularly attractive in production situations calling for high speed assembly or uniting of parts, components, laminae, etc. or providing of protective coatings or finishes. This reflects their ability to generally combine the properties of good bond strength with fast set time.

In certain instances polyester-based thermoplastic adhesives have not shown to be particularly effective. One such instance, and that to which the present invention directs its attention, relates to situations in which a surface or surfaces of a part, component, laminae, or the like presented for attachment or finish by or with a polyester-based thermoplastic adhesive is constituted of a polyvinyl chloride. Stating it again, the adhesive attachment attained at a polyvinyl chloride surface by polyester-based thermoplastic adhesives has been found to be less than desirable.

Various expedients have been used in attempts to improve adhesion or adhesive attachment between polyester-based thermoplastic adhesives and polyvinyl chloride surfaces. In general these attempts include priming the polyvinyl chloride surfaces using mechanical and chemical abrading means, the latter referring to the use of organic solvents. While there has been some success following these practices, it has been less than hoped. The disruptive and/or destructive capacity of the first of these eliminates it from consideration in many instances, such as where the polyvinyl chloride surface is defined on a thin member, such as a sheet, foil, etc. The second practice then, priming with organic solvent, simply fails to improve or facilitate improvement of the adhesion to a desired extent unless very severe application procedures are practiced. This too can lead to disruption or destruction of the type previously indicated.

It is an object of this invention to provide improved adhesion or adhesive attachment between polyvinyl chloride surfaces and polyester-based thermoplastic adhesives.

It is another object of this invention to provide polyvinyl surfaces exhibiting improved adhesion or adhesiveness or adhesive characteristics or receptivity with polyester-based thermoplastic adhesives.

These and other objects are attained by applying a liquid primer including a carboxylic acid to a polyvinyl chloride surface to which is to be adhesively attached a polyester-based thermoplastic adhesive.

The surfaces to be primed in practicing the present invention may be regular, irregular or include various designs, etc. and, they may be partially or entirely polyvinyl chloride commonly referred to simply as vinyl. Parts, or other members, or structures including the surfaces may be formed by extrusion, molding, calendering, etc., from solid, dispersion or solution polyvinyl chloride resins. Similarly, the polyvinyl chloride parts or members may be any of those characterized as rigid, semirigid or flexible as well as being solid or foam in nature. Additionally, the parts may be extremely thin, as reflected by various flexible and rigid films, and range all the way to those of thick sectioned nature as is had in many molded parts.

The polyvinyl chloride constituting the surfaces to be primed in practicing this invention, may be a homopolymer or copolymer, the latter represented by various vinyl chloride-vinyl acetate copolymers, vinyl chloride-vinyl acetate-vinyl alcohol terpolymers, and vinyl chloride-vinylidene chloride copolymers, to mention some of the better known. In addition the polyvinyl chloride may be a blend or be blended with other organic polymeric materials such as polystyrene, synthetic elastomeric polymers such as those based on butadiene, butadiene-styrene, butadiene-acrylonitrile and others. The polyvinyl chloride may include various additives and adducts such as plasticizers, for example, dioctyl phthalate and tricresyl phosphate, stabilizers such as barium, cadmium and lead compounds, also others represented by 2-(2'-hydroxy-5'-methylphenyl) benzotriazole and 2 - hydroxy-4-methoxybenzophenone; lubricants such as stearic acid and zinc palmitate, zinc stearate and metal compounds of organic acids; fillers such as the various fibrous types, glass fibers, natural and synthetic fibers etc. also calcium carbonate and calcium silicate; as well as pigments such as titanium dioxide and others.

Through practice of the present invention adhesion at polyvinyl chloride surfaces is facilitated with polyester-based thermoplastic adhesives. The latter refers to a class of materials which are solid at usual room temperature, and capable of being heat activated to a fluid or molten condition at temperatures generally ranging between 80° C. to 300° C. In this range preferably they will have relatively low viscosity allowing them to be applied to a surface where they are designed to act as an adhesive or coating, using convenient applicating means and methods, such as by brushing, extruding, spraying, etc.

As indicated the adhesives are polyester-based. A number of polyesters may be used in producing them. These include for example, polyesters derived from terephthalates, isophthalates, sebacates, succinates, etc. Preferred polyesters include condensates of lower alkylene glycols such as ethylene glycol or butylene glycol with dicarboxylic acids, more specifically condensates of butylene glycol, specifically 1,4 butane diol with mixed terephthalate and isophthalate components in mol ratios from 1 to 1 to about 4:1. Other condensates include mixtures of ethylene glycol and butylene glycol with mixtures of terephthalate, isophthalate and sebacate components. Percentagewise the latter may range in a preferred situation 40–60 terephthalate, 20–50 isophthalate and 10–20 sebacate components. Other polyesters which are intended include the polyesteramides, for example, that obtained from reacting phthalic anhydride, butylene glycol and hexamethylene diamine.

Other organic polymeric materials may be combined with the polyesters in producing the polyester-based thermoplastic adhesives. Examples include thermoplastic polymeric materials such as polyolefins, for example polystyrene, polyethylene, and polybutene, also polymers of vinyl alkyl ethers where the alkyl groups contain 1–4 carbon atoms; polymers and copolymers of lower alkyl acrylates and methacrylates. Others include polyvinyl acetates and the hydrocarbon resins such as the polyterpenes. Thermosetting or curing organic polymeric compositions may also be included, such as phenolic resins, various rubber compositions, polyepoxides, etc.

The polyester-based thermoplastic adhesives may contain various additives and adducts such as plasticizers, and some of the polymeric materials mentioned above are included for that purpose, as well as stabilizers, flow agents, fillers, colorants, etc.

The liquid primer used in practicing this invention includes a carboxylic acid. In the usual case the primer comprises a solution of a carboxylic acid and on occasion may be a suspension of the acid in a liquid suspending medium. For convenience suspensions are intended to be included within the term solutions and solvents are intended to include suspending media in this disclosure.

Carboxylic acids which may be used include monocarboxylic acids such as acetic, benzoic, butyric, caprylic 2 ethyl hexanoic, formic, isodecanoic, lauric, naphthoic, oleic and palmitic acids, and half esters of phthalic and isophthalic acids etc., dicarboxylic acids such as adipic, azelaic, fumaric, malic, malonic, oxalic, succinic, phthalic, sebacic, also phthalic anhydrides, etc.; and tricarboxylic acids such as citric and trimellitic acids, etc. An example of a carboxylic acid having greater carboxylic acid functionality is pyromellitic acid. Of the various acids adipic acid and azelaic acid are preferred.

Various of the carboxylic acids are liquid with the remainder solids under ordinary conditions. Those which are liquids under ordinary conditions, such as acetic acid may be used in that form as primers. In the case of the acetic acid that would refer to the glacial form and as well the ordinary aqueous forms. Generally, however, it is preferred to provide the carboxylic acids in solutions or suspensions.

Solvents and suspending media which may be used in the primers include water and various organic solvents. The latter are represented by various alcohols such as methyl, ethyl, propyl, isopropyl, and butyl alcohols; also ketones such as diethyl ketone, methyl ethyl ketone, methyl isopropyl ketone, various ethers such as cellosolves, carbitols, etc. Preferred solvents are those which are organic in nature. This is for the reason that they have greater facility for being spread on the polyvinyl chloride surface. Of those the aliphatic alcohols are the more preferred with isopropyl alcohol giving perhaps the best all around performance.

In the preferred form, that is when the carboxylic acid is provided in solvated or suspended form to produce the liquid filler, it is preferred that the amount of carboxylic acid present range 2 to 50 weight percent. A more preferred range is 3 to 10 weight percent. Referring specifically to the primers indicated as being preferred to wit: solutions of adipic acid or azelaic acid in isopropyl alcohol, a preferred range for the adipic or azelaic acid concentration may be 3 to 10 weight percent. Specific amounts or concentrations may be determined further based upon the particular acid and solvent or suspending medium used, as well as the particular environment and surface on which the particular primer is designed for use.

The primer may contain various additives to improve wetting, solubility or suspension characteristics and the like. These, however, are generally not recommended for the reason that they may leave deposits or residues on the polyvinyl chloride surfaces which would tend to interfere with adhesion if not effectively removed before application of the adhesive.

The primer is applied to the polyvinyl chloride surface by any convenient means and method such as brushing, spraying or the like. In the general case the primer is applied at room temperature using those techniques. However, it is possible to provide the primer temperatures other than that, and specifically at elevated temperatures. When this latter is the case, the primer may be applied by merely exposing the surface to be primed to vapors evolving from the primer. Of course, this also may be practiced with primers maintained at room temperature provided their vapor pressures are such that sufficient vapor is evolved at room temperatures. An example of this can be practiced using acetic acid and acetic acid solutions as the primer. There priming may be effected by passing the surface to be primed closely over a liquid body of the acid or solution maintained at room temperature.

While in general there is no necessity to rub the primer into the surface, as distinguished from applying it onto the surface which could also be called rubbing, it is preferred that it be subjected to light rubbing by a soft-surfaced means such as a soft cloth or the like. Two or three light passes of rubbing give excellent results.

After the primer is applied to the polyvinyl chloride surface it is allowed to dry or is dried to the extent that any excess is removed. Thereafter the polyester-based thermoplastic adhesive may be applied to the primed polyvinyl chloride surface. The surface remains in primed condition for an extended time, in excess of 30 days. As a result there is no necessity to apply the adhesive immediately after priming has been carried out.

The following examples are provided for the purpose of further illustrating the invention.

EXAMPLE I

(A) General procedure

A flexible sheet or film material is provided constituting a three part laminate. This material is commonly used to produce washable laundry bags, table cloths, etc. At one surface this material is .005 inch thick white pigmented plasticized polyvinyl chloride, and at the other surface the material is .005 inch thick green pigmented plasticized polyvinyl chloride. A nylon scrim material is interposed between the two vinyl surfaces. The overall thickness of the film material is about .015 inch. The polyvinyl chloride is actually a vinyl chloride-vinyl acetate copolymer in which the vinyl acetate constituted about 5.0 percent vinyl acetate.

Sample pieces are cut from the film material which are about 2.0 x 4.0 inches.

Other than in control situations, the surfaces of sample pieces are primed at either surface by application of the liquid primer which includes carboxylic acid. The primer is soaked up from a liquid supply in a soft woolen cloth, and applied with two like passes (strokes). After a period of 1–10 seconds the excess primer is wiped off, again with a soft woolen cloth.

Various polyester-based thermoplastic adhesives in liquid molten form, at temperatures 80° C. to 185° C., are spread onto the vinyl surfaces to form a melt thickness of about .020 inch. The melt is allowed to cool to room temperature over a period of about 2 minutes.

Testing of the adhesive quality of the bond obtained between the adhesive and the vinyl surface is usually carried out after the adhesive has been allowed to stand at room temperature in solidified condition for a period of about 2 hours. Using pliers or similar instrument, the solidified adhesive deposit is peeled from the sheet. The results are observed and determined on the basis of whether the adhesive deposit can be separated from the polyvinyl chloride surface without tearing of that surface taking place or being caused. In that event it is considered that no adhesion takes place even though in fact some adhesion does occur. The second observation taken is in terms of what percent of the polyvinyl chloride surface in contact with the adhesive is torn away.

The following are the formulations for the polyester-based thermoplastic adhesives which are used.

TABLE 1

| Component | Adhesive | | | | | | |
|---|---|---|---|---|---|---|---|
| | A | B | C | D | E | F | G |
| | Amounts/parts by weight | | | | | | |
| Dimethyl terephthalate | 51.0 | | | 50 | | | |
| Terephthalic acid | | 44.0 | 59.0 | | 34.0 | 46.0 | 34 |
| Isophthalic acid | 41.0 | 44.0 | 24.0 | 50 | 50.0 | 54.0 | 50 |
| Azelaic acid | | 12.0 | | | | | |
| Dibutyl sebacate | 8.0 | | 17.0 | | | 16 | |
| Hexahydrophthalic anhydride | | | | | | | 16 |
| Trimellitic anhydride | | | | | | | 2.0 |
| 1,4 butanediol, equivalent wt. | 1.5 | 1.57 | 1.65 | 1.65 | 1.65 | 1.5 | 1.5 |

(B) Control samples

Three hundred control samples are prepared and tested in the manner set forth above in paragraph (A). All of the adhesives A to G are used in the various samples, and are applied at temperatures of 115° C. to 185° C. In this case, the polyvinyl chloride surfaces are not primed. Of the samples 293 evidenced no tearing of the polyvinyl chloride when the adhesive melt is peeled off. Of the remainder 5 evidenced less than 15% tearing and again of the remaining two one evidenced 30% tearing and the other 70% tearing of the polyvinyl chloride surfaces.

(C) Mechanical priming

Thirty samples are prepared using the procedure of paragraph (A) above, with the exception that the surfaces are primed by rubbing or abrading with sand, common salt, Ethocel N-7 (finely divided particulate cellulose ethyl ether), Parlon 190 cps. (finely divided chlorinated rubber), calcium carbonate and ester gum. Adhesive B is used and applied at 220-230° C. All tests give 100% peel or no adhesion with the polyvinyl chloride surfaces.

(D) Isopropyl alcohol priming

Five samples are prepared using the procedure of paragraph (A) but using isopropyl alcohol as the priming agent. The adhesive used is Adhesive B, which is applied at 230° C. Four of the samples show no adhesion and the remaining sample shows 50% tearing of the polyvinyl chloride surfaces.

(E) Adipic acid/isopropyl alcohol priming

Three hundred and twenty-five samples are prepared as indicated in paragraph (A) above. The surface of the samples, are primed with a 7% adipic acid in isopropyl alcohol solution. All of the adhesives A to G are used on the various samples. The applicating temperatures for the adhesives range from 180° C. to 280° C. Some of the samples are maintained up to 54 days after priming and prior to application of the adhesives. Of the samples 310 give 100% tearing of the vinyl and the remaining 15 samples give 85-95% tearing of the vinyl surfaces.

(F) Azelaic acid/isopropyl alcohol priming

Ten samples are prepared as indicated in paragraph (A) above. The surfaces of each, one each, are primed with 5% azelaic acid in isopropyl alcohol solution. Adhesive E is used on the various samples. The applicating temperatures for the adhesives range 143° C. to 180° C. Nine of the samples give 100% tearing and the remaining give 95% tearing of the polyvinyl chloride surfaces.

(G) Benzoic acid/ethyl alcohol priming

Six samples are prepared as indicated in paragraph (A) above. The surfaces of the samples are primed with 5% benzoic acid in ethyl alcohol. Adhesives A and F are used with applicating temperatures at 143° C. to 200° C. Five samples give 100% tearing and the remaining sample 80% tearing of the vinyl surfaces.

(H) Maleic acid/water priming

Thirty test samples are prepared in accordance with the procedure set forth in paragraph (A) above. The surfaces are primed at a surface with a 10% solution of maleic acid in water. The adhesives used are B, C and E, and their applicating temperatures 143° C. to 260° C. Twenty-four samples give 100% tearing and the remaining six 65-95% tearing of the vinyl surfaces.

(I) Citric acid/water priming

Fifty test samples are prepared in accordance with the procedure set forth in paragraph (A) above. The surfaces are primed at the surface with a 25% citric acid in water solution. The adhesive used is B and it is applied at temperatures of 149° C. to 183° C. Forty of the samples give 100 percent tearing, four give 90-95% tearing and six give 65-85% tearing of the vinyl surfaces.

(J) Benzoic acid/methyl ethyl ketone priming

Ten samples are prepared in accordance with the procedure set forth in paragraph (A) above. Each of the samples are primed at the surface with 5-10% solution of benzoic acid in methyl ethyl ketone followed by thorough drying. The adhesives used are B and C, and their applicating temperatures 150 to 185° C. Eight of the samples give 100% tearing and the remaining two 85% and 95% tearing of the vinyl surfaces.

(K) Acetic acid-benzoic acid/ethyl acetate-isopropyl alcohol priming

Five samples are prepared according to the procedure of paragraph (A) above. Each of the samples are primed at one surface with a liquid primer constituting:

| Constituent: | Percent (wt.) |
|---|---|
| Acetic acid | 5 |
| Benzoic acid | 5 |
| Ethyl acetate | 45 |
| Isopropyl alcohol | 45 |

The adhesive used is B which is applied to primed surfaces at temperatures of 160° C. to 180° C. Four of the samples give 100% tearing and the remainder 95% tearing of the vinyl surfaces.

(L) Acetic acid/water priming

Four samples are prepared according to the procedure set forth earlier at paragraph (A). A primer solution is prepared comprising 50% glacial acetic acid and 50% water. Each of the samples is suspended for 15 seconds to 30 seconds about one inch above a bath of the primer solution (25 ml. of the priming solution in a 100 ml. beaker) maintained at room temperature. Thereafter adhesive B is applied to a surface of each of the samples at a melt temperature of 180° C. All of the samples give 100% tearing of the vinyl surfaces of the samples.

(M) Laundering characteristics

Laundry bags are provided from the laminated material identified in paragraph (A) above. These are each constructed from two panels of the material 18 x 24 inches in size. Each panel is provided at three peripheral edges of one surface with a primed surface extending one inch inwardly. The primer used is a 7% adipic acid in isopropyl alcohol solution. Thereafter, the primed surfaces on one of each of two panels is provided with a 0.5 inch wide, 0.02 inch thick deposit of Adhesives A and F using an applicating temperature of about 180° C. The two panels are assembled quickly on a flat metal surface with the adhesive deposits interposed between the primed surfaces. The surfaces are then pressed together at 8 p.s.i. for a period of 5 seconds to form laundry bags having adhesive bonded seams on three ends.

The bags, ten in number, are subjected to severe laundering of the type carried out in many hospitals. This includes the steps of:

(a) Washing at 70-72° C. for a period of 6 minutes in a water washing solution including 0.5 percent strong alkali soap (sodium stearate-synthetic detergent-phosphate) and 1.0 percent of hypochlorite bleach.

(b) Rinsing in water having a temperature of 65–70° C. for a period of 15 minutes. Actually, there are three separate rinses of 5 minutes each.

(c) Securing acid bluing (1.0 percent acetic acid and 0.05 percent bluing) is carried out at 65–67° C. for 5 minutes.

(d) Drying with tumbling is carried out for 6 minutes at 70–72° C. in some instances.

At the end of 102 launderings, in which drying is carried out 21 times, the seams are peeled apart in the manner indicated previously. The results obtained from all ten instances range between 95–100% tearing of the vinyl surfaces.

It will thus be seen that the objects set forth above, among those made apparent from the preceding description, are efficiently attained, and since certain changes may be made in the above method and in the various products set forth without departing from the scope of the invention, it is intended that all matter contained in the above description shall be interpreted as illustrative and not in a limiting sense.

Having thus described my invention what I claim as new and desired to secure by Letters Patent of the United States is:

1. A method for providing improved adhesion between a polyvinyl chloride surface and a polyester-based thermoplastic adhesive which comprises the steps of applying to said surface (a) a liquid primer consisting essentially of a carboxylic acid in an amount greater than about 2.0 weight percent based on the weight of primer and then (b) a polyester-based adhesive in molten condition to the primed surface.

2. A method according to claim 1 wherein the carboxylic acid is adipic acid.

3. A method according to claim 1 wherein the carboxylic acid is azelaic acid.

4. A method according to claim 1 wherein the carboxylic acid is a monocarboxylic acid.

5. A method according to claim 4 wherein the monocarboxylic acid is acetic acid.

6. A method according to claim 1 wherein the liquid primer is a solution of carboxylic acid in water.

7. A method according to claim 1 wherein the liquid solvent is a solution of a carboxylic acid in organic solvent.

8. A method according to claim 7 wherein the organic solvent is isopropyl alcohol.

References Cited

UNITED STATES PATENTS

| | | | |
|---|---|---|---|
| 2,698,240 | 12/1954 | Alles et al. | 117—76 X |
| 2,824,024 | 2/1958 | Chapman | 117—76 |
| 2,824,025 | 2/1958 | McIntyre | 117—76 |
| 2,829,069 | 4/1958 | Michel | 117—76 |
| 3,013,914 | 12/1961 | Willard. | |
| 3,014,501 | 12/1961 | Jacobi. | |
| 3,022,192 | 2/1962 | Brandt | 117—47 X |
| 3,149,997 | 9/1964 | Tamburro | 117—76 |
| 3,219,475 | 11/1965 | Dixler | 117—76 |
| 3,377,187 | 4/1968 | Donaldson et al. | 117—76 X |
| 3,396,046 | 8/1968 | Landau | 117—76 X |

WILLIAM D. MARTIN, Primary Examiner

H. J. GWINNELL, Assistant Examiner

U.S. Cl. X.R.

117—76, 122, 138.8